Feb. 21, 1956  W. F. COLLINS ET AL  2,735,533
HARVESTING GATHERING MECHANISM
Filed Sept. 29, 1951  3 Sheets-Sheet 1

Inventors.
William F. Collins
Thomas J. Scarnato
Paul O. Pippel
Att'y.

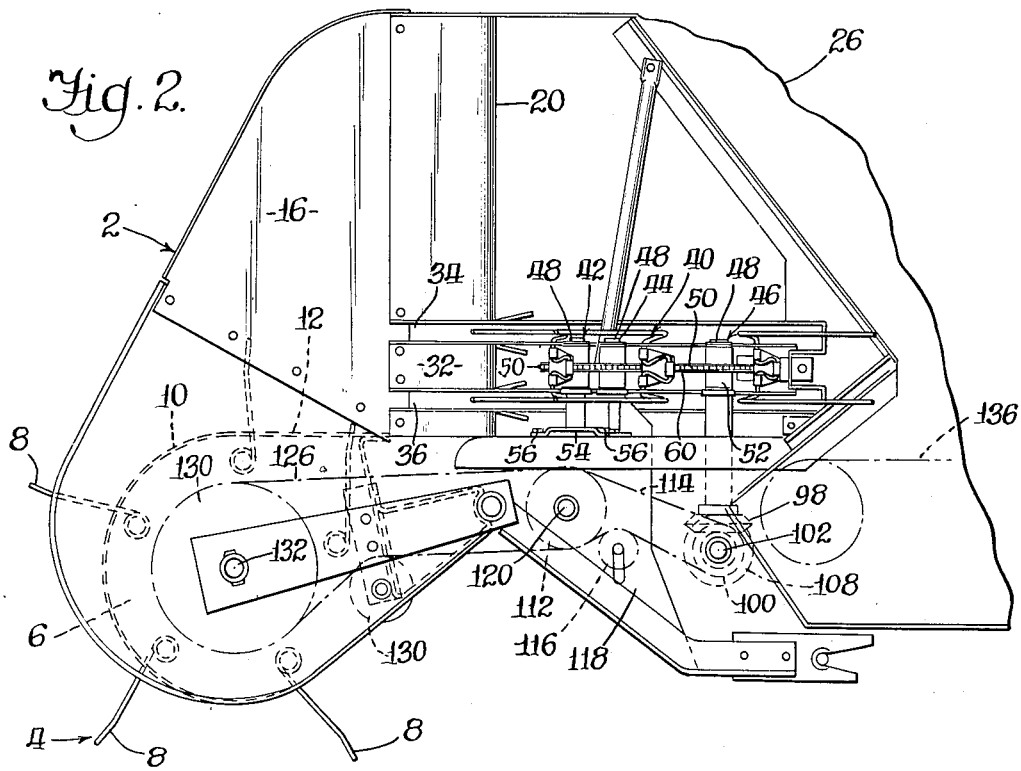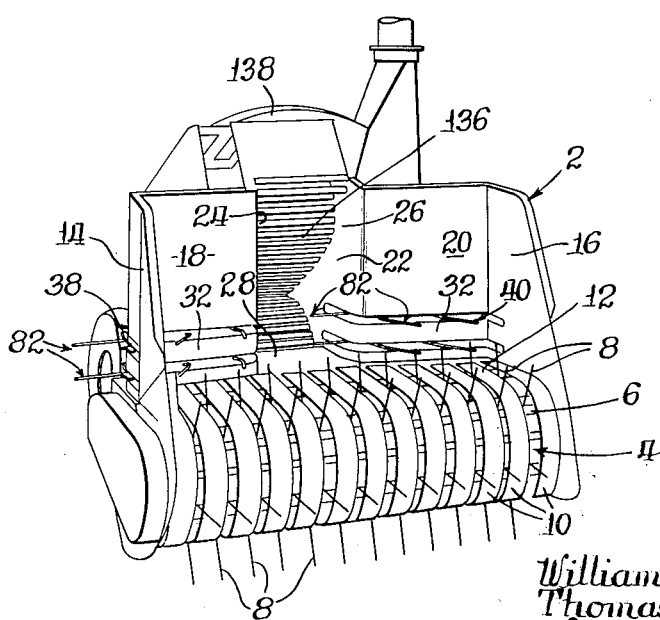

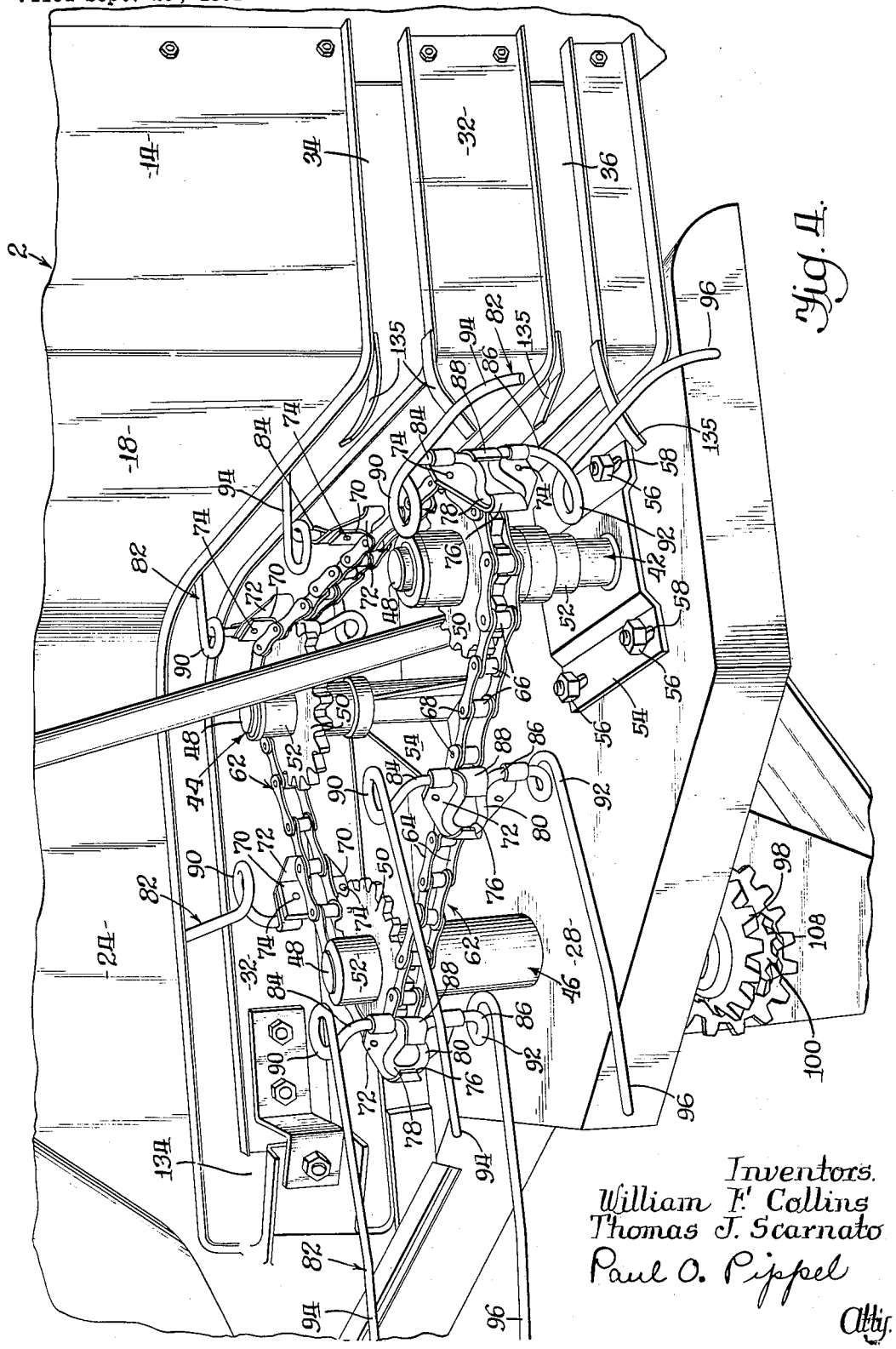

United States Patent Office 2,735,533
Patented Feb. 21, 1956

2,735,533

HARVESTING GATHERING MECHANISM

William F. Collins, Westmont, and Thomas J. Scarnato, Chicago, Ill., assignors to International Harvester Company, a corporation of New Jersey Application September 29, 1951, Serial No. 248,986

5 Claims. (Cl. 198—162)

This invention relates to gathering means for harvesters and especially to hay harvesting apparatus.

A general object is to provide a novel harvesting mechanism including a pick-up arranged to lift a wide swath and deliver to novel condensing means arranged to shift the crop laterally from opposite ends of the pick-up into a centrally located narrow throat structure.

A further object is to provide simple and efficient gathering means which sweep along the rear of the pick-up deck and advance the crop into the throat, the gathering means being arranged to obtain compensatory aggressiveness on the increasing mass of the crop as it is bunched towards the inlet of the throat to effectively enter the crop into the throat; the gathering means being further arranged to move the crop within the throat and to gradually lose aggressiveness as it progresses towards the discharge end of the throat to facilitate its withdrawal from the crop.

The invention contemplates the provision of a trough for containing the crop delivered thereto from the pick-up, the trough having upstanding sides on its lateral and rear extremities, the rear sides being angled inwardly, rearwardly to the throat and merged into forward edges of generally parallel side panels of the throat to accommodate the increased bulk or volume of the material as it is shifted towards the center of the platform.

A different object of the invention is to devise a novel gathering mechanism at each side of the throat, each mechanism including an endless chain trained about a plurality of sprockets, the chain carrying outstanding fingers which are adapted to enter onto the platform structure through the side panels thereof, sweep across the platform with the outer extremities of the fingers moving in planes gradually receding rearwardly as the fingers approach the throat, the fingers of the opposed mechanisms then moving in rearwardly converging curving paths which obtain a maxima of approach to each other inwardly of the forward or inlet extremity of the throat structure and thereafter diverge rearwardly and gradually disappearing through the side panels of the throat structure. This pattern of the fingers is obtained by disposing the supporting sprocket for each chain in a manner wherein the length of the chain in back of each rear panel of the platform structure generally parallels it, and the length of chain alongside each side panel of the throat structure is angled outwardly therefrom.

A further object is to provide a simplified gatherer assembly featuring disappearing fingers which are arranged to easily disengage from the crop at the discharge zone.

A corollary object is to provide a novel stripper assembly with stripper bars which are depressed at their discharge extremities with respect to the crop engaging sides thereof to provide novel relief areas for small bunches of crop therein to forestall pinching of the crop by the outer ends of the forwardly angling fingers as they are disappearing through the stripper bars.

A still further object is to arrange a novel drive for the chains such that the extensions thereof along the sides of the throat are loaded in tension to obtain an efficient raking attitude by the fingers moving within the throat.

These and other objects of the invention will become more apparent from the specification and the drawings, wherein:

Figure 2 is a side elevational view.

Figure 3 is a fragmentary front perspective view, and

Figure 4 is a fragmentary side perspective view thereof.

Figure 1:
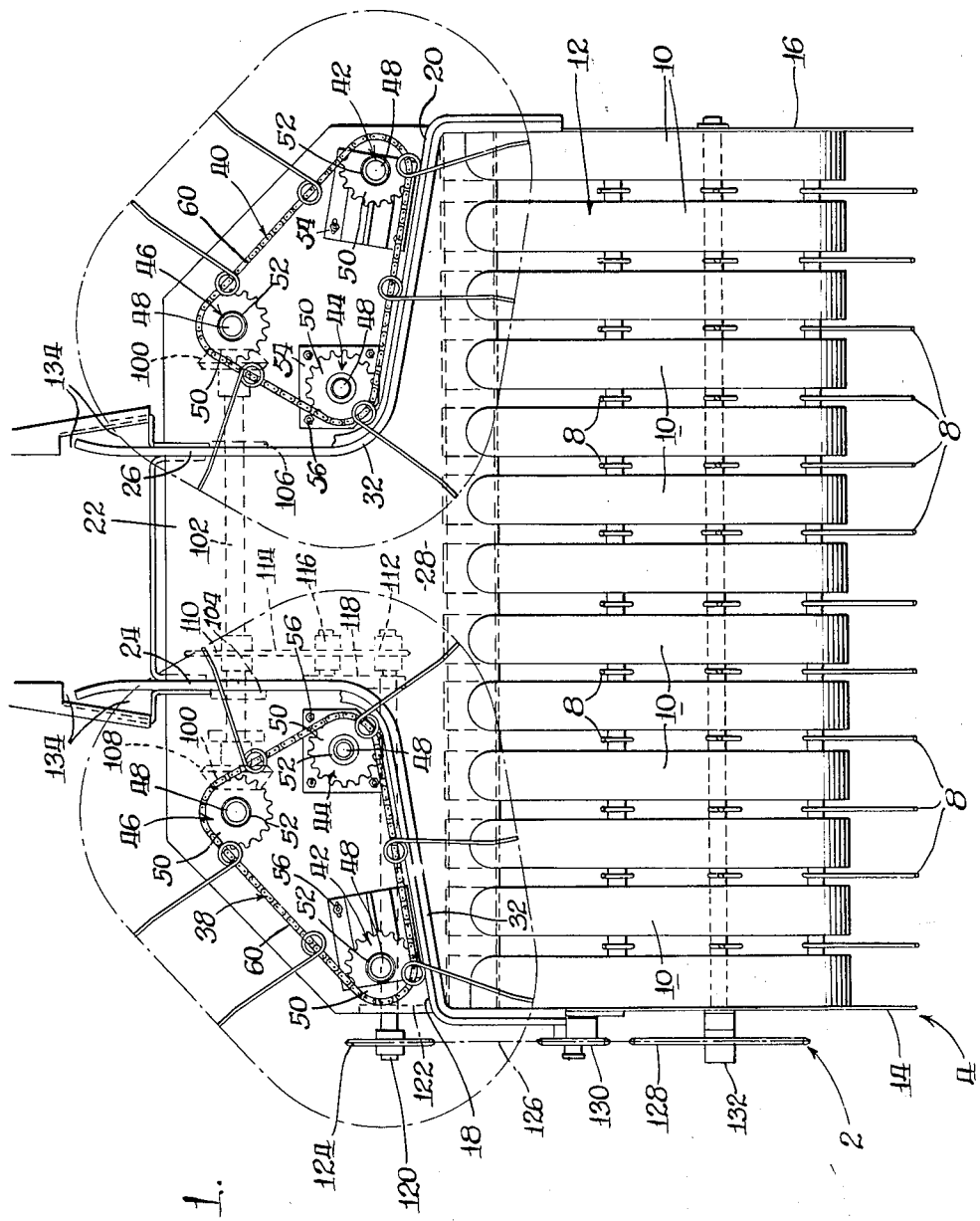
Figure 1 is a fragmentary top plan view of a pick-up mechanism incorporating the invention.

Describing the invention in detail, the harvesting mechanism generally designated 2 comprises a forward wide swath pick-up 4 of the general type shown and described in C. R. Raney et al. U. S. Patent 1,815,227 or B. M. Hyman U. S. Patent 2,256,829 and may comprise a revolving drum 6 provided with a plurality of outstanding cammed tines 8, 8 interdigitated with a plurality of stripper bars 10, 10 spaced axially of the drum and wrapped therearound, said stripper bars forming, on the top side of the drum or picker, a horizontal deck or platform 12 which at its lateral edges is connected to upstanding side panels 14 and 16. The rear of the platform is formed by upright spaced rear wall segments 18 and 20 extending inwardly from the rear edges of the panels 14 and 16 respectively, and disposed in substantially vertical planes converging generally horizontally rearwardly to a centrally disposed narrow throat structure generally indicated 22. The inner extremities of the wall sections 18 and 20 are continued rearwardly in generally parallel vertical planes to form side wall elements generally indicated 24 and 26, of the throat. A bottom wall or panel 28 extends beneath the lower edges of the wall members 24 and 26 as well as walls 18 and 20 and at its forward edge is connected to the rear edge of the platform or deck 12.

Each side of the trough and throat is formed with an opening which is longitudinally bifurcated by a slat member or stripper bar 32 to form substantially parallel slots 34 and 36 which initiate in the rear portion of the associated side panel of the trough and continue along the extent of the associated rear panel segment of the trough and extend to adjacent the rear extremity of the associated panel or side wall member of the throat.

The bottom plate 28 extends outwardly of the outer sides of the throat behind the rear panel segments 18 and 20 and provides a support for substantially identical condensing gathering mechanisms generally indicated 38 and 40 at opposite sides of the throat.

Each mechanism comprises three sprocket assemblies 42, 44 and 46 which are arranged in triangular relationship. Each sprocket assembly comprises a vertical shaft 48 carrying a sprocket 50 and journaling a bearing 52 thereof, and the shafts of assemblies 42 and 44 are provided with a suitable mounting platform 54 connected as by bolts 56, 56 to the plate 28. Preferably, the sprocket assembly 42 may be adjustably mounted on the platform 28 by the provision of elongated slots 58, 58 in the mounting plate thereof in which the bolts 56, 56 extend, the slots 58 being oriented to permit shifting of the position of the assembly 42 with respect to the assemblies 44 and 46. As best seen in Figure 1 each of the sprocket assemblies 42 may be positioned adjacent to the lateral ends of the trough back of the respective rear wall segments. The sprocket assemblies 44 may be disposed at or within the corners formed between the respective rear panel segments of the trough and adjacent side walls of the throat, and the sprocket assemblies 46 may be located rearwardly with respect to the associated assemblies 42 and 44 and spaced a considerable distance outboardly of the adjacent side wall member 24 or 26. An endless flexible element in the form of a chain 60 is trained about each set of sprockets. This positions a length of each chain extending between the sprocket assemblies 42 and 44 generally parallel to the plane of the associated rear panel segment 18 or 20 and disposes a length of chain extending between the sprocket assemblies 44 and 46 alongside the related side panel member 24 or 26 in a substantially vertical plane diverging rearwardly outwardly with respect to the plane of the associated side panel member of the throat. The remaining length of chain extends diagonally between the sprocket assemblies 46 and 42. For convenience in identifying these various lengths of chain, that part between sprockets 42 and 44 may be termed an advance length and that between sprockets 44 and 46 a discharge length and that between sprocket assemblies 46 and 42 a return length.

Each chain orbits in a generally horizontal plane and is provided with a series of articulatingly interconnected lengths 62, 62, each length including a pair of generally parallel side members 64, 64 and a roller 66 between respective ends of the member 64, 64 which are interconnected to each other and to the related ends of the side members of the preceding and succeeding length by pins 68. Certain regularly spaced lengths may have the side members 64, 64 thereof provided with outturned substantially coplanar tabs 70, 70 extending transversely of the chain length, said tabs forming a seating area for the innerside of a flat mounting plate 72 connected to the tabs as by rivets 74, 74. The plate 72 is elongated in the direction of the length of the chain and extends alongside an adjacent length. The mounting plate 72 is formed at one end with a lug 76 which bent around the head or bight end 78 of a U-shaped loop lever arm 80 of a finger assembly generally indicated 82 and formed of a suitable resilient wire. The plane of the loop 80 parallels the mounting plate 72 and seats against the outer side thereof and has its butt end extending to the other longitudinal extremity of the plate whereat each end of the loop 80 is formed with upper and lower substantially coaxial extensions 84 and 86 which lie in the plane of the loop and seat against the outer side of the plate. The plate is formed at the end adjacent to the butt extremity of the lever arm 80 with a lug 88 intermediate its top and bottom edges which is bent over the butt extremity of the lever arm 80 and extends between the inner ends of the extensions 84 and 86. The outer extremities of the extensions are formed with torque loops 90 and 92 respectively, said loops being disposed in substantially parallel planes disposed transversely to the axis of said extensions. The outer extremities of the loops 90 and 92 are formed with outwardly extending substantially parallel superposed fingers 94 and 96 respectively, said fingers being bent or curved back with respect to the direction of travel to facilitate their withdrawal from the crop.

Each sprocket assembly 46 constitutes part of the driving means for the associated chain and the other sprocket assemblies 42 and 44 serve as idlers and guides. The shaft of each assembly 46 is keyed to the sprocket 50 thereof and is provided at its lower end with a bevel gear 98 below plate 28 which meshes with an adjacent bevel gear 100 constrained for rotation with a cross shaft 102 supported beneath the plate 28 from suitable brackets 104 and 106. The shaft is provided with a sprocket 108 (Figure 1) adjacent to one end thereof, said sprocket being chain driven from a suitable power source as will be readily understood by those skilled in the art. The shaft 102 is further provided with a sprocket 110 intermediate its ends beneath the throat structure for driving a sprocket 112 by a chain 114 which is trained about an idler 116 connected to the bracket 118 depending from the plate 28. The sprocket 112 is keyed to the inner end of a cross shaft 120 which is journaled suitably to the bracket 118 and a bracket 122 on the underside of the plate 28, said shaft 120 extending outwardly from the right side of the unit and keyed to a sprocket 124 which drives a chain 126 trained about sprocket 128 and an adjusting idler sprocket 130. The sprocket 128 is keyed to a shaft 132 which is journaled from the extensions of the side panels 14 and 16 below the plane of the deck 12. The shaft 132 forms the axis of rotation for the pick-up drum 6.

In operation the pick-up is advanced into the cut hay and rakes it onto the platform. Simultaneously, the condensing means sweeps the crop from the lateral extremities of the trough structure into the throat and it will be seen that the disposition of the chains is such that the fingers thereon enter between diverging guide fingers 135, 135 (Figure 4) through the side panels of the trough and then move rearwardly as they approach the throat. It will be seen that the extent of wrap of each chain about the sprocket of the associated assembly 44 and the diagonal disposition of the discharge length of the chain provides for a backing on the chain of an extent which encompasses the related inlet corner of the throat and initiates substantially in advance of the corner and terminates at an area whereat the fingers are substantially halfway into the throat as seen from the path diagram in Figure 1. This feature reduces the flexibility of the chain in this area and recognizes the increased load which must be moved by the fingers as the crop is condensed at the throat inlet. In this respect the path of the fingers is such that their outer ends ascribe rearwardly converging curved paths convexed toward each other. The maxima of approach of the fingers of the opposed gathering or condensing means occurs in an area inwardly of the inlet extremity of the throat and the curved path continues beyond this area of maximum approach and then when the chain leaves the sprocket assembly 44 the path of the outer ends of the fingers straightens out such that the outer ends of the opposed condensing means move in substantially vertical, rearwardly diverging planes. It will be seen that the disposition of the chain alongside each side panel wall member and the throat is such as to cause gradual withdrawal of the fingers from the crop as the fingers are moved toward the discharge extremities of the throat.

It will be seen that the discharge extremities of the stripper bars at opposite sides of the throat are offset outwardly with respect to the throat to provide relief depressions or cavities 134 about which the outer extremities of the fingers pass. This feature precludes the possibility of pinching the crop and possibly breaking the fingers or the stripper bars. It will be realized that the crop involved such as hay which comprises substantial lengths will readily clear itself of these relief areas by being shifted along with the plants intermingled therewith. The fingers are spaced a sufficient distance apart so as to insure this clearance before a succeeding finger passes through the relief area.

The throat discharges to conveying means 136 (Fig. 3) which may feed to a suitable blower structure 138 discharging into a wagon or the like as will be understood by those skilled in the art.

We claim:
1. In a harvesting machine, an upright paneling having angularly arranged generally flat sections defining crop guiding surfaces on one side thereof and an outer corner, said paneling having generally horizontal slots therethrough extending from one section to the other, means for shifting the crop along one of said sections to said corner, then around the corner and along the other section and comprising an annular bearing member positioned inside said corner and rotatable on an axis generally parallel to the planes of the sections, a flexible element movable on a portion of the periphery of the member facing toward the paneling and having a rectilinear length running along the opposite side of the one section generally parallel thereto and another rectilinear length extending from said member along the opposite side of the other section in diverging relationship thereto, and outstanding fingers on the element adapted to enter the slots at the one section, sweep around the corner and along the other section and gradually withdraw there- from, said fingers being flexible and deflectable in a trailing direction as respects to their direction of movement as the movement of said fingers is accelerated about said corner and abruptly slowed along said other length of said element whereby causing said fingers to pitch the crops engaged thereby along said other section.

2. In a crop gathering apparatus, a narrow throat structure having substantially parallel side panels and a bottom, wall members extending laterally outwardly from the forward ends of respective side panels, each panel and corresponding wall member being provided with a plurality of substantially horizontal continuous slots, means for shifting the crop from along the outer extremities of the wall structures towards and into the throat and comprising an endless flexible element at each side of the throat and rotatable about generally vertical axes and each having a length along the corresponding wall member and another length adjacent a contiguous side panel, fingers on the element enterable into the slots at the outer extremities of the wall members, and means in guiding engagement with each element to path the fingers in a manner developing the maximum closeness of approach of the fingers on one element with respect to the fingers on the other at an area inwardly of the inlet end of the throat, said fingers being flexible generally parallel to the direction of travel.

3. In a device of the class described, a chain comprising a plurality of articulatingly interconnected links, mounting plates connected to certain of the links and elongated longitudinally of the chain, a finger element mounted on each plate and comprising a central lever arm formed as a loop and seated against the plate longitudinally thereof, a lug on one end of the plate bent around the head end of the loop arm to hold it against the plate, the other end of the arm formed with lateral extensions parallel to the plate and seated thereagainst, a lug on the plate embracing each extension against the plate, another lug on the plate entered between the extensions and clamped against the outer side of the butt end of the arm, a torque loop on the outer end of each extension disposed in a plane angularly to the axis of the extension, and a finger projecting outwardly from the outer end of each torque loop and disposed substantially in the plane thereof.

4. In a crop moving device, a receptacle having laterally spaced upright rear sections arranged in rearwardly converging relationship, a throat extending rearwardly from between adjacent ends of said sections and including upright generally parallel side panels connected at their forward ends to the respective panels, each section and panel connected thereto having a continuous slot therein along the bottom thereof, a stripper bar centered within each slot and substantially coextensive therewith and connected to the related panel and section, a bottom element connected to said sections and panels, condensing means at opposite sides of the device and each comprising an endless chain with outstanding fingers enterable through the adjacent slot in interdigitating relationship with the related stripper bar, means for running the chain along the related section generally parallel thereto and along the respective side panel of the throat in rearwardly diverging relationship thereto whereby the fingers on the chain are caused to disappear through the panel adjacent to the discharge extremity of the throat, and means for driving each chain in driving engagement therewith at an area adjacent to the rear extremity of the throat for loading the chain in tension along the side panels of the throat to reduce the flexibility thereof along the throat whereby obtaining a more positive raking attitude by the fingers when within the throat, said fingers being flexible and said chains being driven at a speed to effect a pitching action by the fingers within said throat.

5. In a crop gathering apparatus, a narrow throat structure having opposed upright side panels and a bottom, a wall member extending laterally outwardly from the forward end of a side panel, said wall member and corresponding panel being provided with at least one continuous generally horizontal slot, means for shifting the crop from along the outer extremity of said wall member towards and into the throat and comprising an endless flexible element at a side of the throat and rotatable about upright axes and said element having a length along the corresponding wall member and another length adjacent a contiguous side panel; fingers on the element enterable into the slot at the outer extremity of the wall member, and means in guiding engagement with said element to path the fingers along said wall member toward said throat and then along the corresponding panel into said throat and out of the throat adjacent to its rear extremity, said fingers being flexible generally parallel to the direction of travel, and driving means operatively associated with said element for driving the same as aforesaid.

References Cited in the file of this patent

UNITED STATES PATENTS

| | | |
|---|---|---|
| 465,052 | Barron | Dec. 15, 1891 |
| 768,976 | Christ | Aug. 30, 1904 |
| 1,496,364 | Bonnafoux | June 3, 1924 |
| 1,583,035 | Valerius et al. | May 4, 1926 |
| 1,680,695 | Shanaberger | Aug. 14, 1928 |
| 1,758,557 | Bullock | May 13, 1930 |
| 2,007,109 | Hauge | July 2, 1935 |
| 2,157,261 | Innes | May 9, 1939 |
| 2,328,278 | Innes | Aug. 31, 1943 |
| 2,351,144 | Oehler | June 13, 1944 |
| 2,381,620 | Russell | Aug. 7, 1945 |
| 2,490,143 | Magee | Dec. 6, 1949 |
| 2,545,188 | Baskerville | Mar. 13, 1951 |